R. S. POTTER.
Car Coupling.
No. 29,815. Patented Aug. 28, 1860.
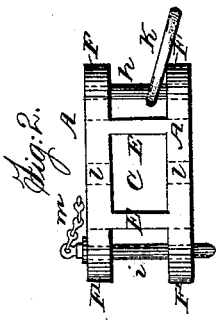
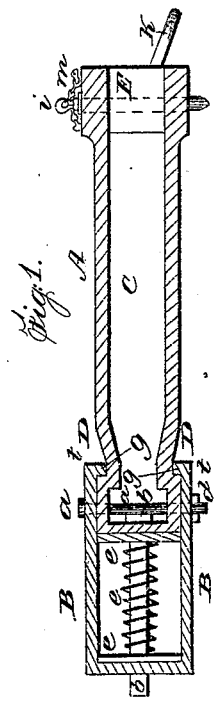
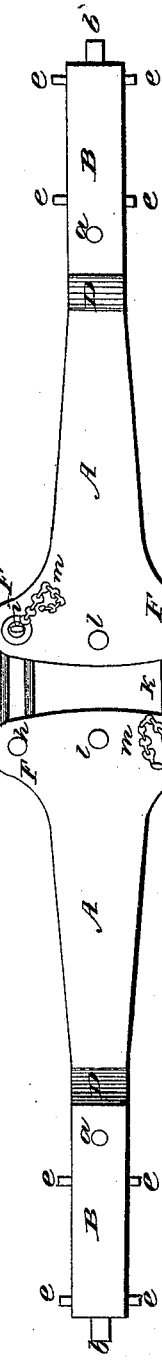
Witnesses.
Geo. Coatsworth
J. Clough Haines
Inventor.
Newsom S. Potter

UNITED STATES PATENT OFFICE.

RANSOM S. POTTER, OF CHICAGO, ILLINOIS.

CAR-COUPLING.

Specification of Letters Patent No. 29,815, dated August 28, 1860.

*To all whom it may concern:*

Be it known that I, RANSOM S. POTTER, of Chicago, in the county of Cook, in the State of Illinois, have invented certain new and useful Improvements in Car-Couplings; and I do hereby declare that the following is a full, clear, and exact description of the construction and operation of the same, reference being had to the annexed drawings, making a part of this specification, in which—

Figure I is an irregular section; Fig. II a front view of the head; Fig. III a top view of the coupling when fully connected.

Like letters refer to similar parts in all the figures.

The nature of my invention consists in constructing a car coupling with projections F F on each side of the drawbar A so that two links may be used and brought into place from the side; in so attaching a wrought iron hasp (B) to the drawbar, by means of projections ($f$) and shoulders ($g$) that the drawbar may be made of cast iron, and in providing a spring bolt or bar ($b$) to support the spring ($c$) and the driving plates ($e$ $e$) which is held in place without the use of a screw or nut by means of the bolt $a$.

To enable others skilled in the art to make and use my invention I will proceed to describe its construction and operation.

I make my drawbar A of cast iron about two feet and nine inches in length, tapering on the sides from the head to the shoulder $g$ and of a size sufficiently large for the nature of the service; it is cast hollow as shown at C (Fig. I) and enlarged at the head by the projections F F so that the full width of the head is about seventeen inches. The sides of the drawbar are brought through the head at E E dividing it into three nearly equal compartments; the partitions E E are brought out full with the head for the purpose of keeping the links $k$ $k$ from turning inward; they also prevent the couplings from passing into each other when brought together at different heights and by these a third compartment or cavity C (Fig. II) is formed so that this coupling may be used in connection with ordinary ones by simply inserting the pins $i$ in the holes $l$ and using the common links. The links $k$ $k$ are permanently attached to the right side of the drawbar by the bolts $h$ $h$ so that they come together properly and prevent any loss of either links or bolts. The upper and lower surfaces of the drawbar are depressed at D about four inches from the end and a shoulder formed at $g$ about three fourths of an inch in height, at which point the hasp B, which is made of wrought iron, is attached by turning the ends inward and forming the projections or hooks $f$, and is fastened to the drawbar by the bolt $a$. The hasp B is about fifteen inches in length and of equal width with the drawbar; in this is inserted the ordinary spring $c$ and the driving plates $e$ $e$, which are held in place by the bolt or bar $b$ passing through them in the center; the bolt or bar $b$ is inserted by being passed through the hollow C and is secured in its place without nut or screw by passing the bolt $a$ just back of its head so that it is impossible for it ever to become displaced, thereby preventing any loss or accident from its becoming loose or falling out. The coupling is attached to the car in the usual manner. Thus is formed a complete coupling which can be made principally of cast iron and is eminently safe, cheap, and one which can be coupled from the side after the cars have been run together and are at rest, without exposure to danger. It conduces to the safety of a train in being less liable to part by breakage of pins or links, as two of each are used.

I do not claim the spring or the driving plates nor any part not especially claimed; but

What I claim as my invention and desire to secure by Letters Patent is—

1. The arrangement for coupling cars from the side by means of two links $k$ $k$ and the projections F F on the drawbar in combination with the bolts $h$ $h$ and the pins $i$ $i$.

2. The arrangement for connecting a wrought iron hasp B to the cast iron drawbar A by means of the hooks or projections $f$, the shoulders $g$ and the bolt $a$.

3. The arrangement for inserting the bolt or bar $b$ and holding it in place without nut or screw by means of the bolt $a$, substantially as set forth and specified.

RANSOM S. POTTER.

Witnesses:
GEORGE COATSWORTH,
J. CLOUGH HAINES.